L. C. BRADY.
TUG FASTENER.
APPLICATION FILED APR. 22, 1907.

916,664.

Patented Mar. 30, 1909.

Inventor
Levi C. Brady

Witnesses
R. C. Claflin
K. Allen

By Victor J. Evans
Attorney

UNITED STATES PATENT OFFICE.

LEVI C. BRADY, OF MILESBURG, PENNSYLVANIA.

TUG-FASTENER.

No. 916,664.  Specification of Letters Patent.  Patented March 30, 1909.

Application filed April 22, 1907. Serial No. 369,695.

*To all whom it may concern:*

Be it known that I, LEVI C. BRADY, a citizen of the United States, residing at Milesburg, in the county of Center and State of Pennsylvania, have invented new and useful Improvements in Tug-Fasteners, of which the following is a specification.

The invention relates to an improvement in tug fasteners designed to form part of the whiffletree tip or ferrule, to permit the convenient application of the tug thereto and to automatically operate to prevent accidental displacement of the tug.

The main object of the present invention is the production of a tug fastener comprising a single integral plate adapted for pivotal connection with the whiffletree tip or ferrule and so formed as to permit the ready application of a tug when the fastener is in one position and prevent disengagement of the tug when the fastener is in another position.

The invention will be described in the following specification, reference being had particularly to the accompanying drawings, in which:—

Figure 1:
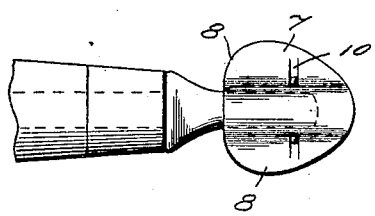
Figure 2:
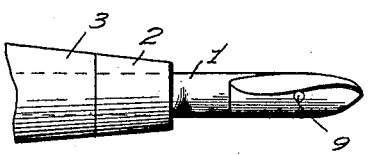
Figure 3:
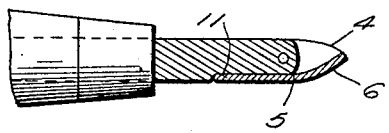
Figure 4:
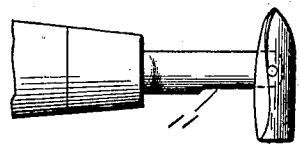

Figure 1 is a plan of a whiffletree end and applied ferrule, the improved fastener being shown in tug receiving position, Fig. 2 is a side elevation of the same, Fig. 3 is a view similar to Fig. 2 with the ferrule shank and fastener in longitudinal section, Fig. 4 is a view similar to Fig. 2 with the fastener shown in operative position.

Referring to the drawings, my improved fastener is designed for connection with the free end of the shank 1 of the ferrule or tip 2, which ferrule, formed in any preferred manner, is designed for connection with the end of a whiffletree, as 3.

The fastener proper comprises a single plate 4, bent to form a central depression 5 which is approximately equal in depth to the diameter of the shank 1. The base wall of the depression curves upwardly at the forward end, as at 6, terminating practically in alinement with the plane of the plate. Beyond the depression the plate is extended in the form of side lips 7, extended practically in alinement with the upper edges of the depression wall, and these lips are of greatest width at a point slightly in advance of the rear edge of the plate. From the point of greatest width the edges of the lips curve rearwardly and inwardly into coincidence with the rear edge of the plate, and forwardly and inwardly into coincidence with the forward edge of the portion 6 of the depression wall. As thus constructed the fastener in plan tapers from a point in advance of the rear edge in both directions toward the front and rear, thereby disposing the greatet weight of material toward the rear of the fastener.

The fastener is designed to be connected to the stem 1 by a pivot pin 9 passed through the walls of the depression 5 in advance of the point of greatest width of the fastener, the under surfaces of the lips 7 being transversely grooved at 10 to permit application of the pin. The shank 1 may, if desired, be reduced at 11 to receive the lower wall of the depression 5, so that when the fastener is in position to permit application of the tug, the relatively lower surfaces of the fastener and shank will be on a plane.

In use the eye of the tug is passed over the fastener with the latter arranged in longitudinal alinement with the shank, as shown in Figs. 1, 2, and 3. After the tug passes beyond the fastener the latter, owing to the preponderance of weight in the relatively rear portion, will swing on the pivot 9 and arrange itself at right angles to the plane of the shank, as shown in Fig. 4. Accidental disengagement of the tug is thus prevented, it being obvious that the fastener may be arranged in the position shown in Fig. 1 to permit disengagement of the tug when desired.

While showing and describing the fastener as applied to the shank of usual whiffletree ferrule, it is obvious that it is equally serviceable in the absence of the ferrule, the whiffletree proper being reduced to provide the shank 1.

Having thus described the invention what is claimed as new, is:—

1. A tug fastener adapted for pivotal connection with the whiffletree shank and comprising a plate formed with a central depression, the bottom wall of said depression curving upwardly at its forward end, lips projecting in opposite directions from the plate and curving downwardly at their forward ends into coincidence with the forward edge of the bottom wall of the depression.

2. A tug fastener adapted for pivotal connection with the whiffletree shank and comprising a plate formed with a central depression, the bottom wall of said depression curving upwardly at its forward end, lips projecting in opposite directions from the plate and curving downwardly at their forward ends into coincidence with the forward edge of the bottom wall of the depression, the lower portion of the whiffletree shank being cut away to receive the bottom wall of the depression.

3. A tug fastener adapted for pivotal connection with a whiffletree shank and comprising an integral plate formed with a central depression, means for pivotally connecting said plate to the shank, that portion of the bottom wall of said depression arranged in advance of the forward end of the shank curving upwardly to a point approximately in line with the pivot, lips projecting in opposite directions from the plate and beyond the whiffletree shank, that portion of each lip in advance of the pivot curving downwardly into coincidence with the forward edge of the bottom wall of the depression, said lips having their maximum width in rear of the pivot and curving from said maximum point into coincidence with the relatively forward and rear edges of the plate.

In testimony whereof, I affix my signature in presence of witnesses.

LEVI C. BRADY.

Witnesses:
JNO. J. BOWN,
ANDREW S. EMEL,
S. D. GETTIG.